United States Patent
Roffman et al.

(10) Patent No.: US 6,899,425 B2
(45) Date of Patent: May 31, 2005

(54) MULTIFOCAL OPHTHALMIC LENSES

(75) Inventors: Jeffrey H. Roffman, Jacksonville, FL (US); Larry G. Jones, Jacksonville, FL (US); James W. Haywood, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/694,962

(22) Filed: Oct. 28, 2003

(65) Prior Publication Data

US 2005/0088615 A1 Apr. 28, 2005

(51) Int. Cl.$^7$ ................................................. G02C 7/04
(52) U.S. Cl. ........................ 351/161; 351/177; 623/6.29
(58) Field of Search .............................. 351/159, 160 R, 351/161, 164, 168–9, 171–2, 177; 623/6.11, 6.3, 6.19, 6.24, 6.27, 6.29

(56) References Cited

U.S. PATENT DOCUMENTS

| | | | |
|---|---|---|---|
| 5,173,723 A | * 12/1992 | Volk | 351/161 |
| 5,198,844 A | 3/1993 | Roffman et al. | 351/161 |
| 5,349,396 A | 9/1994 | Roffman et al. | 351/161 |
| 5,485,228 A | 1/1996 | Roffman et al. | 351/161 |
| 5,507,979 A | 4/1996 | Roffman et al. | 264/1.8 |
| 5,512,220 A | 4/1996 | Roffman et al. | 264/2.5 |
| 5,745,211 A | * 4/1998 | Mukaiyama et al. | 351/169 |
| 5,812,237 A | * 9/1998 | Roddy | 351/169 |
| 6,179,420 B1 | 1/2001 | Roffman et al. | 351/161 |

FOREIGN PATENT DOCUMENTS

WO  WO 95/26518  4/1996

OTHER PUBLICATIONS

U.S. Appl. No. 10/354,401, Jones et al.
U.S. Appl. No. 10/357,873, Roffman et al.
U.S. Appl. No. 10/284,613, Roffman et al.

* cited by examiner

Primary Examiner—Jordan M. Schwartz
Assistant Examiner—Jessica Stultz
(74) Attorney, Agent, or Firm—Lois Gianneschi

(57) ABSTRACT

The invention provides multifocal lenses for correction of presbyopia. Each of the lenses of the invention provide both distance and near vision correction by providing both a first multifocal region, a monofocal region, and a second multifocal region within the same lens.

29 Claims, 1 Drawing Sheet

MULTIFOCAL OPHTHALMIC LENSES

FIELD OF THE INVENTION

The invention relates to ophthalmic lenses. In particular, the invention provides lenses that incorporate more than one optical power, or focal length, and that are useful in the correction of presbyopia.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is totally absent.

Among the methods used to correct presbyopia is the mono-vision lens system in which a person is fitted with, and wears, two contact lenses; one lens for distance vision and one lens for near vision. The mono-vision system permits the wearer to distinguish both distance and near objects, but is disadvantageous in that a substantial loss in depth perception results.

Another method for presbyopia correction is the use of multifocal contact lenses. Each multifocal contact lens provides distance and near vision power or distance, near and intermediate power. These lenses overcome the depth perception loss and typically use alternating concentric rings or alternating radial segments of distance and near power. However, multifocal contact lenses are problematic in that they expose the wearer's retina to two images at once, one in and one out of focus. The two images are not disadvantageous for near vision because the out of focus distance objects being viewed in the near segments of the lens do not interfere, but rather contribute to the near vision resolution. The reason for this is that the out of focus distance objects are in an orientation that does not interfere with the near images.

However, such lenses are problematic for distance vision. As the wearer views distant objects through the lens, the near images also being viewed go through focus before the distant images. As a result, the out of focus near images are inverted and interfere with the image of the distant object. Thus, a need exists for multifocal lenses that that overcome the disadvantages of known lenses.

DETAILED DESCRIPTION OF THE INVENTION AND PREFERRED EMBODIMENTS

Figure 1:
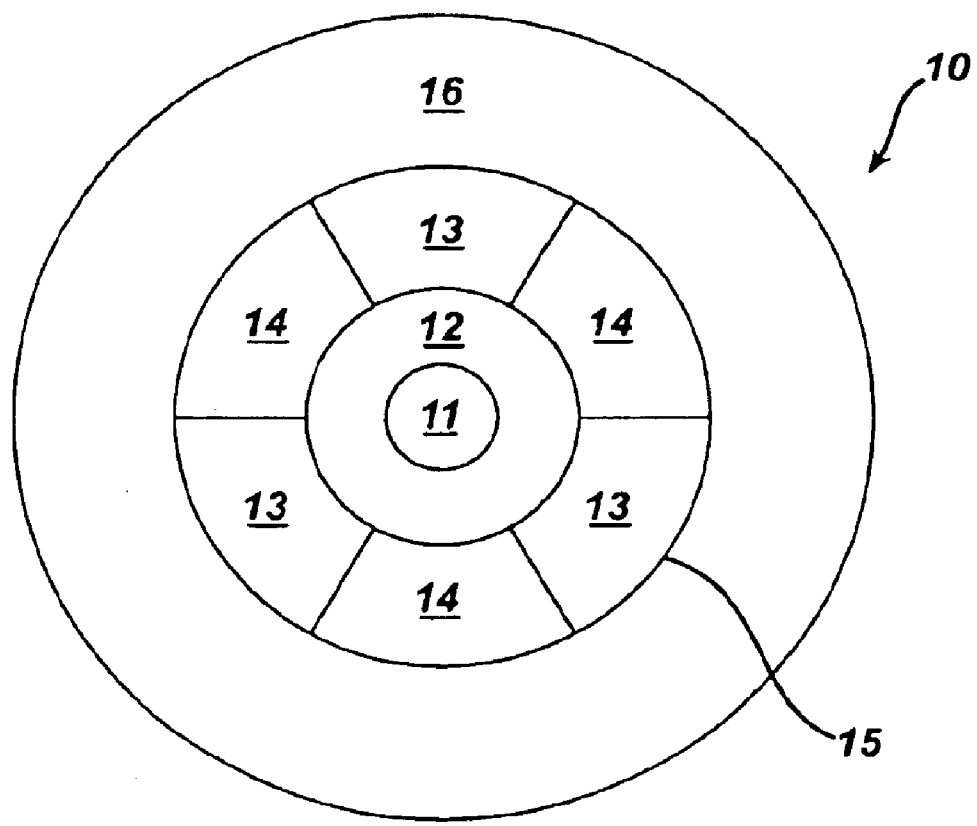
FIG. 1 is a plan view of a lens surface of one embodiment of the lens of the invention.

The invention provides methods for correcting presbyopia, lenses for such correction, and methods for producing the lenses of the invention. Each of the lenses of the invention provide both distance and near vision correction by providing both multifocal and monofocal regions within the same lens.

In one embodiment, the invention provides an ophthalmic lens for a lens wearer comprising, consisting essentially of, and consisting of an optic zone having a first region that is a multifocal region, a second region that is a monofocal region, and a third region of alternating distance optical power segments and near optical power segments wherein the near optical power segments are asymmetrical.

By "ophthalmic lens" is meant a contact, intraocular lens, or the like, or combinations thereof. Preferably, the lenses of the invention are contact lenses. By "multifocal region" is meant a region in which the power continuously increases from distance to near optical power or continuously decreases from near to distance optical power as one moves outwardly toward the lens edge from the center of the region.

By "distance optical power" is meant the amount of refractive power required to correct the wearer's distance vision acuity to the desired degree. By "near optical power" is meant the amount of refractive power required to correct the wearer's near vision acuity to the desired degree. By "asymmetrical" is meant that given any first point that is on a near optical power segment of the lens surface, any second point on the surface that is at a corresponding location 180 degrees around the center of the lens from the first point is a point on a distance optical power segment of the surface. The near optical power segments in the asymmetrical portion of the lenses of the invention may be any distance from each other provided that the asymmetry requirement is met.

FIG. 1 depicts a plan view of a surface of lens 10 of the invention. Lens 10 has an optic zone containing multifocal region 11, monofocal region 12, and region 15 which is a region of asymmetric, alternating, distance and near optical power segments. The optic zones is surrounded by non-optical zone 16. The multifocal region of the lens of the invention preferably is located at the optical center of a surface of the lens. The multifocal region used in the lenses of the invention has at least distance and near vision power, and preferably distance, near, and intermediate vision power. By "intermediate vision power" is meant power that is suitable for viewing objects located at distances of about 46 to about 80 cm from the eye. Intermediate vision power may be supplied as a consequence of the power progression between the peak of the power of the near and distance optical power within the multifocal zone. In a preferred embodiment, a pair of lenses according to the invention is provided, the lens to be worn on the eye dominant for distance vision having a multifocal region in which the power continuously increases from distance to near optical power as one moves outwardly from the center of the lens and region to the periphery of the region.

The multifocal region may be designed by any convenient method. Preferably, the multifocal region is designed wherein a position, an amplitude, and a width for the region is determined by the following equation:

$$Y = \left[ \left[ \frac{8a^3}{4a^2 + P(x+k)^2} \right]^S \right] * Add \quad (I)$$

wherein:
Y is the Add power at any point x on a surface within the multifocal region;
x is a point on the lens surface;
a is 0.5;
k is the point within the multifocal region at which the power peaks;
P is the coefficient that controls the width of the multifocal region and is greater than about 0 and less than about 15;
S is the coefficient that controls the amplitude and its decrease in the periphery of the multifocal region and is greater than about 0 and less than about 30; and
Add is a value that is equal to or less than the difference in power between the near vision power and distance vision power of the multifocal region.

Alternatively, the multifocal region may be a region wherein a speed or contour, meaning, the slope of the power change from near to distance power, for the zone is determined by the following equation:

$$Add_{(x)} = Add_{peak} * (1/(a*(1+(x/x_c)^{2n}))) \qquad (II)$$

wherein:

$Add_{(x)}$ is actual instantaneous add power at any point x on a surface of the lens within the multifocal region;

x is a point on the lens surface at a distance x from the center;

a is a constant and preferably is 1;

$Add_{peak}$ is the full peak dioptric add power, or add power required for near vision correction;

$x_c$ is the cutoff semi-diameter or the midpoint in the power transition from distance to near power, or near to distance power within the multifocal region;

n is a variable between 1 and 40, preferably between 1 and 20; and

Add is a value that is equal to the difference in power between the near vision power and distance vision power of the multifocal region.

In Equation II, n is the variable that controls the slope of the progression from near to distance vision power and distance to near vision power in the multifocal region. The less the value of n, the more gradual the progression will be.

In another embodiment, the multifocal power region may be such that the a speed or contour for the zone is determined by the following equation:

$$Add_{(x)} = Add_{peak} * (1/(a*(1+(x/x_c)^2)*n)) \qquad (III)$$

wherein:

$Add_{(x)}$ is actual instantaneous add power at any point x on a surface of the lens within the multifocal region;

x is a point on the lens surface at a distance x from the center;

a is a constant and preferably is 1;

$Add_{peak}$ is the full peak dioptric add power within the multifocal region;

$x_c$ is the cutoff semi-diameter within the multifocal region;

n is is a variable between 1 and 40, preferably between 1 and 20; and

Add is a value that is equal to the difference in power between the near vision power and distance vision power of the multifocal region.

In a fourth embodiment, the multifocal power region is such that the speed and a contour for the region is determined by the following equation:

$$Add_{(x)} = Add_{peak} * (1/(a*(1+(x/x_c)^d)*n)) \qquad (IV)$$

wherein:

$Add_{(x)}$ is actual instantaneous add power at any point x on a surface of the lens within the multifocal region;

x is a point on the lens surface at a distance x from the center;

a is a constant and preferably is 1;

d is an arbitrary value between 1 and 40;

$Add_{peak}$ is the full peak dioptric add power within the multifocal region;

$x_c$ is the cutoff semi-diameter within the multifocal region;

n is between 1 and 40, preferably between 1 and 20; and

Add is a value that is equal to the difference in power between the near vision power and distance vision power of the multifocal region.

The second region of the lens lies at the periphery, and preferably surrounds, the multifocal region. The second region is a monofocal region that may be distance, intermediate, or near optical power. The power of the monofocal region preferably is the same power as the power at the extreme periphery of the multifocal region and which is immediately adjacent to the monofocal region. For example, if the multifocal region increases from near to distance vision power as one moves from the center of the multifocal region to the its periphery, relative to the lens periphery, the monofocal region will be distance vision power.

The third region of the lens is adjacent to and lies at the periphery of, and preferably substantially surrounds, the monofocal region. The third region contains both distance and near optical power segments of any convenient shape that are asymmetrical. Preferably, the segments are radial segments. More preferably, the radial segments are triangular in shape. Any number of near and distance segments may be used. Preferably however, the number of near optical power segments are equal to or less than the areas for distance optical segments within the third region. The region may also include segments of intermediate vision optical power. However, if intermediate vision power segments are provided, they too preferably are asymmetrical in that, given any first point that is on an intermediate optical power segment of the lens surface, any second point on the surface that is at a corresponding location 180 degrees around the center of the lens from the first point is a point on a distance or near optical power segment of the surface.

As shown in FIG. 1 region 15 has near optical power segments 13 alternating with distance optical power segments 14. As shown, the distance and near segments are arc-shaped alternating as one moves circumferentially around the center of the lens. Any number of alternating distance and near segments may be used. Preferably, three segments each of distance and near optical power are used.

In the lenses of the invention, the distance, near, and intermediate optical powers may be spherical, aspheric, or toric powers. Additionally, each of the three regions and the distance, near optical power zones or segments therein may be of any desired and practical dimensions. The multifocal, monofocal, and asymmetrical distance and near segment regions may be on the same surface of the lens. Alternatively, the multifocal and monofocal, multifocal and asymmetrical segments, or asymmetrical segments and monofocal region may be on one surface and the remaining region may be on the opposite lens surface. Preferably, the multifocal, monofocal, and asymmetric regions are all on the same surface. More preferably, all three regions are on the front, or object side, surface of the lens.

The lens of the invention may, if desired, include a zone for rotationally stabilizing the lens on eye. Any number of rotational stabilization zones are known in the art and may be used in the lens of the invention. Typically, rotational stabilization is categorized as static or dynamic stabilization. Examples of rotational stabilization includes, without limitation, ballast, prism ballast, thick zone, thin zone, protuberances on the lens surface, such as one or more bosses, and the like and combinations thereof. If the lens includes toric correction, or cylinder power, a stabilization zone will be required.

In still another embodiment of the invention, one surface of the lens provides each of the multifocal, monofocal and asymmetric segment regions and the other surface of the lens corrects the lens wearer's high order aberrations. By high order aberrations is meant aberration of third or higher order. In yet another embodiment, on the front surface of the lens is each of the multifocal, monofocal and asymmetric segment regions and the back, or eye side, surface is matched to the wearer's corneal topography meaning that the back surface inversely corresponds to the wearer's corneal topography. Such lens incorporates an inverse topographic elevation map of the lens wearers' cornea. The inverse topographic elevation map may be derived from the wearer's corneal topography, which corneal topography may be determined by any known method including, without limitation, by use of a corneal topographer. For soft contact lens manufacture, the elevational data initially is applied to a lens model in the unflexed state. Next, the data is transformed by taking into account the soft lens flexure, or wrap, when the lens placed on the eye. Thus, the effects of both elevation of the cornea and wrap are accounted for when using the corneal topographic data. The flexure transformed data then may be mapped onto a CNC grid pattern and used to make the lenses or mold tool surface.

In yet another embodiment, cylinder power may be provided. In one such embodiment, on one surface of the lens is each of the multifocal, monofocal and asymmetric a segment regions and the opposite surface is a toric surface. As yet another embodiment, cylinder power may be combined with one or more of the asymmetric distance and near optical power segments, the monofocal, and the multifocal region.

The lenses of the invention may be made by any convenient method. One such method uses a lathe to produce mold inserts. The mold inserts in turn are used to form molds. Subsequently, a suitable lens material is placed between the molds followed by compression and curing of the resin to form the lenses of the invention. One ordinarily skilled in the art will recognize that any number of known methods may be used to produce the lenses of the invention.

Contact lenses useful in the invention may be made of hard lens materials or soft lens materials, but the invention may provide particular utility when applied to the design and production of soft contact lenses. Thus, soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel, such as galyfilcon, or a hydrogel, such as etafilcon A.

A preferred lens material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Ser. No. 60/363,630 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens material may be carried out by any means known including, without limitation, thermal, irradiation, chemical, electromagnetic radiation curing and the like and combinations thereof. Preferably, the lens is molded which molding is carried out using ultraviolet light or using the full spectrum of visible light. More specifically, the precise conditions suitable for curing the lens material will depend on the material selected and the lens to be formed.

Polymerization processes for ophthalmic lenses including, without limitation, contact lenses are well known. Suitable processes are disclosed in U.S. Pat. No. 5,540,410 incorporated herein in its entirety by reference.

What is claimed is:

1. A lens, comprising an optic zone having a first region that is a multifocal region located at the optical center of a surface of the lens, a second region that is a monofocal region located adjacent to and encircling the multifocal region, and a third region of alternating distance optical power segments and near optical power segments located adjacent to and encircling the monofocal region wherein the near optical power segments are asymmetrical.

2. The lens of claim 1, wherein the lens is a contact lens.

3. The lens of claim 2, wherein the first, second and third regions are located on a front surface of the lens.

4. The lens of claim 2, wherein the lens further comprises a cylinder power.

5. The lens of claim 3, wherein a back surface of the lens is a toric surface.

6. The lens of claim 3, wherein a back surface of the lens inversely corresponds to an individual's corneal topography.

7. A contact lens, comprising an optic zone having a first region that is a multifocal region, a second region that is a monofocal region, and a third region of alternating distance optical power segments and near optical power segments wherein the near optical power segments are asymmetrical wherein the first multifocal region is designed so that a position, an amplitude, and a width for the region is determined by the following equation:

$$Y = \left[\left[\frac{8a^3}{4a^2 + P(x+k)^2}\right]^S\right] * Add$$

wherein:

Y is an add power at any point x on a surface within the multifocal region;

x is a point on the lens surface;

a is 0.5;

k is a point within the multifocal region at which there is a power peak;

P is greater than about 0 and less than about 15;

S is greater than about 0 and less than about 30; and

Add is a value that is equal to or less than a difference in power between the near vision power and distance vision power of the multifocal region.

8. A contact lens, comprising an optic zone having a first region that is a multifocal region, a second region that is a monofocal region, and a third region of alternating distance optical power segments and near optical power segments wherein the near optical power segments are asymmetrical, wherein the multifocal region is designed so that a speed or contour, meaning, the slope of the power change from near to distance power, for the zone is determined by the following equation:

$$Add_{(x)} = Add_{peak} * (1/(a*(1+(x/x_c)^{2n}))$$

wherein:

$Add_{(x)}$ is an actual instantaneous add power at any point x in the multifocal region;

x is a point in the multifocal region at a distance x from a center of the surface;

a is a constant;

$Add_{peak}$ is an add power required for near vision correction;

$x_c$ is a midpoint in a power transition from distance to near power in the multifocal region;

n is a variable between 1 and 40; and

Add is a value that is equal to the difference the near vision power and distance vision power in the multifocal region.

9. A contact lens, comprising an optic zone having a first region that is a multifocal region, a second region that is a monofocal region, and a third region of alternating distance optical power segments and near optical power segments wherein the near optical power segments are asymmetrical, wherein the multifocal region is designed so that a speed or contour for the zone is determined by the following equation:

$$Add_{(x)} = Add_{peak} * (1/(a*(1+(x/x_c)^2)*n)) \quad \text{(III)}$$

wherein:

$Add_{(x)}$ is actual instantaneous add power at any point x on a surface of the lens within the multifocal region;

x is a point on the lens surface at a distance x from the center;

a is a constant and preferably is 1;

$Add_{peak}$ is the full peak dioptric add power within the multifocal region;

$x_c$ is the cutoff semi-diameter within the multifocal region;

n is is a variable between 1 and 40, preferably between 1 and 20; and

Add is a value that is equal to the difference in power between the near vision power and distance vision power of the multifocal region.

10. A contact lens, comprising an optic zone having a first region that is a multifocal region, a second region that is a monofocal region, and a third region of alternating distance optical power segments and near optical power segments wherein the near optical power segments are asymmetrical, wherein the multifocal region is designed so that a speed and a contour for the region is determined by the following equation:

$$Add_{(x)} = Add_{peak} * (1/(a*(1+(x/x_c)^d)*n)) \quad \text{(IV)}$$

wherein:

$Add_{(x)}$ is actual instantaneous add power at any point x on a surface of the lens within the multifocal region;

x is a point on the lens surface at a distance x from the center;

a is a constant and preferably is 1;

d is an arbitrary value between 1 and 40;

$Add_{peak}$ is the full peak dioptric add power within the multifocal region;

$x_c$ is the cutoff semi-diameter within the multifocal region;

n is between 1 and 40, preferably between 1 and 20; and

Add is a value that is equal to the difference in power between the near vision power and distance vision power of the multifocal region.

11. A method of designing a lens, comprising the step of providing an optic zone having a first region that is a multifocal region located at the optical center of a surface of the lens, a second region that is a monofocal region located adjacent to and encircling the multifocal region, and a third region of alternating distance optical power segments and near optical power segments located adjacent to and encircling the monofocal region wherein the near optical power segments are asymmetrical.

12. A method of correcting presbyopia, comprising the step of providing an optic zone having a first region that is a multifocal region located at the optical center of a surface of the lens, a second region that is a monofocal region located adjacent to and encircling the multifocal region, and a third region of alternating distance optical power segments and near optical power segments located adjacent to and encircling the monofocal region wherein the near optical power segments are asymmetrical.

13. The lens of claim 1, wherein the monofocal region surrounds the multifocal region and the third region surrounds the monofocal region.

14. The lens of claim 1, wherein the segments of the third region are radial segments.

15. The lens of claim 14, wherein the radial segments are triangular in shape.

16. The lens of claim 13, wherein the segments of the third region are radial segments.

17. The lens of claim 16, wherein the radial segments are triangular in shape.

18. The lens of claim 7, wherein the segments of the third region are radial segments.

19. The lens of claim 18, wherein the radial segments are triangular in shape.

20. The lens of claim 8, wherein the segments of the third region are radial segments.

21. The lens of claim 20, wherein the radial segments are triangular in shape.

22. The lens of claim 9, wherein the segments of the third region are radial segments.

23. The lens of claim 22, wherein the radial segments are triangular in shape.

24. The lens of claim 10, wherein the segments of the third region are radial segments.

25. The lens of claim 24, wherein the radial segments are triangular in shape.

26. The lens of claim 7, wherein the monofocal region surrounds the multifocal region and the third region surrounds the monofocal region.

27. The lens of claim 8, wherein the monofocal region surrounds the multifocal region and the third region surrounds the monofocal region.

28. The lens of claim 9, wherein the monofocal region surrounds the multifocal region and the third region surrounds the monofocal region.

29. The lens of claim 10, wherein the monofocal region surrounds the multifocal region and the third region surrounds the monofocal region.

* * * * *